(12) United States Patent
Tian et al.

(10) Patent No.: US 12,294,310 B2
(45) Date of Patent: May 6, 2025

(54) METHOD AND APPARATUS FOR CONTROLLING REVERSE CURRENT OF PHASE-SHIFTED FULL-BRIDGE CIRCUIT

(71) Applicant: CONTEMPORARY AMPEREX TECHNOLOGY (HONG KONG) LIMITED, Hong Kong (CN)

(72) Inventors: Qinyuan Tian, Ningde (CN); Huanle Zhou, Ningde (CN); Sigui Zhang, Ningde (CN); Jinfeng Gao, Ningde (CN); Meng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 244 days.

(21) Appl. No.: 18/315,893

(22) Filed: May 11, 2023

(65) Prior Publication Data

US 2023/0283162 A1 Sep. 7, 2023

Related U.S. Application Data

(63) Continuation of application No. PCT/CN2021/122324, filed on Sep. 30, 2021.

(51) Int. Cl.
*H02M 3/335* (2006.01)
*H02M 1/00* (2007.01)

(52) U.S. Cl.
CPC ..... *H02M 3/33584* (2013.01); *H02M 1/0009* (2021.05); *H02M 1/0058* (2021.05); *H02M 3/33573* (2021.05)

(58) Field of Classification Search
CPC .. H02M 3/01; H02M 3/1586; H02M 3/33573; H02M 3/33584; H02M 3/335–33592
See application file for complete search history.

(56) References Cited

U.S. PATENT DOCUMENTS

2014/0104890 A1 4/2014 Matsubara et al.
2019/0157979 A1* 5/2019 Higaki ............... H02M 3/1586

FOREIGN PATENT DOCUMENTS

CN 103326580 A 9/2013
CN 103457475 A * 12/2013
(Continued)

OTHER PUBLICATIONS

Yu-Kang Lo et al: "Phase-Shifted Full-Bridge Series-Resonant DC-DC Converters for Wide Load Variations", (Jun. 1, 2011) IEEE Transactions on Industrial Electronics, vol. 58, No. 6, p. 2572-2575 (Year: 2011).*

(Continued)

*Primary Examiner* — Sean Kayes
*Assistant Examiner* — Jennifer C Caulk
(74) *Attorney, Agent, or Firm* — ANOVA LAW GROUP, PLLC (57) ABSTRACT

A control method includes determining an error value of a reverse input current of a phase-shifted full-bridge circuit based on sampling and reference values of the reverse input current, determining a compensation control quantity of a switch drive signal of the phase-shifted full-bridge circuit based on the error value. The compensation control quantity corresponds to a period or a duty cycle of the switch drive signal. The method further includes determining period and duty cycle control quantities of the switch drive signal based on the compensation control quantity. The period control quantity is within a value range of the period of the switch drive signal, and the duty cycle control quantity is within a value range of the duty cycle of the switch drive signal. The method also includes controlling the switch drive signal based on the period control quantity and the duty cycle control quantity.

15 Claims, 4 Drawing Sheets

(56) References Cited

FOREIGN PATENT DOCUMENTS

| CN | 104578341 | A | 4/2015 |
|----|-----------|---|--------|
| CN | 105099157 | A | 11/2015 |
| CN | 112018999 | A | 12/2020 |
| JP | 2010161843 | A | 7/2010 |

OTHER PUBLICATIONS

The World Intellectual Property Organization (WIPO) International Search Report and Written Opinion for PCT/CN2021/122324 Jun. 24, 2022 15 Pages (including translation).
The European Patent Office (EPO) The Extended European Search Report for Application No. 21958936.3 Jan. 18, 2024 11 Pages.
Ngoc Dat Dao et al., "High-efficiency SiC-based isolated three-port DC/DC converters for hybrid charging stations." IEEE Transactions on Power Electronics 35.10 (2020): 10455-10465.
Yu-Kang Lo et al. "Phase-shifted full-bridge series-resonant DC-DC converters for wide load variations." IEEE Transactions on Industrial Electronics 58.6 (2010): 2572-2575.

* cited by examiner

//METHOD AND APPARATUS FOR CONTROLLING REVERSE CURRENT OF PHASE-SHIFTED FULL-BRIDGE CIRCUIT

CROSS-REFERENCE TO RELATED APPLICATION

This application is a continuation of International Application No. PCT/CN2021/122324, filed on Sep. 30, 2021, the entire content of which is incorporated herein by reference.

TECHNICAL FIELD

Embodiments of the present application relate to the filed of power electronics, and more specifically, to a method and apparatus for controlling a reverse current of a phase-shifted full-bridge circuit.

BACKGROUND ART

Charging and discharging batteries is a common application scenario for batteries, but an excessive input current will inevitably affect the production safety and service life of batteries. Therefore, controlling a current for charging and discharging batteries can effectively improve the production safety of the batteries and effectively prolong the service life of the batteries. However, an existing method for controlling a current cannot effectively control a wide range of input current, which may affect the production safety and service life of batteries. Therefore, how to provide an effective solution for controlling a current has become an urgent problem to be solved.

SUMMARY

The present application provides a method and apparatus for controlling a reverse current of a phase-shifted full-bridge circuit, which can effectively control a wide range of input current.

A first aspect of the present application provides a method for controlling a reverse current of a phase-shifted full-bridge circuit, including: determining an error value of a reverse input current of the phase-shifted full-bridge circuit based on a sampling value of the reverse input current and a reference value of the reverse input current; determining a first compensation control quantity of a switch drive signal of the phase-shifted full-bridge circuit based on the error value, where the first compensation control quantity is a compensation quantity of the error value, and the first compensation control quantity is a control quantity corresponding to a period or duty cycle of the switch drive signal; determining a period control quantity and a duty cycle control quantity of the switch drive signal based on the first compensation control quantity, where the period control quantity is within a value range of the period of the switch drive signal, and the duty cycle control quantity is within a value range of the duty cycle of the switch drive signal; and controlling the switch drive signal based on the period control quantity and the duty cycle control quantity.

In the embodiment of the present application, after the compensation control quantity is obtained based on the sampling value and the reference value of the reverse input current of the phase-shifted full-bridge circuit, the period control quantity and the duty cycle control quantity that are used to control the switch drive signal are determined based on the compensation control quantity. In this way, both the period and the duty cycle of the switch drive signal are adjustable, so that a control range of the input current can be greatly expanded.

In some possible embodiments, the determining a period control quantity and a duty cycle control quantity of the switch drive signal based on the first compensation control quantity includes: when the first compensation control quantity satisfies the value range of the period of the switch drive signal, determining the period control quantity to be the first compensation control quantity and the duty cycle control quantity to be a first predetermined value.

In the embodiment of the present application, the duty cycle control quantity is set to the first predetermined value, the period control quantity is equal to the compensation control quantity, and the period control quantity is precisely within a range of the period control quantity that is required for normal operation of the circuit.

In some possible embodiments, the determining a period control quantity and a duty cycle control quantity of the switch drive signal based on the first compensation control quantity includes: when the first compensation control quantity is less than a lower limit of the value range of the period of the switch drive signal, determining the period control quantity to be the lower limit of the value range of the period of the switch drive signal and the duty cycle control quantity to be the first predetermined value.

In the embodiment of the present application, the duty cycle control quantity is set to the first predetermined value, the period control quantity is equal to a lower limit value of the value range of the period, and the period control quantity is a minimum period control quantity required for normal operation of the circuit, such that the circuit operates normally.

In some possible embodiments, the determining a period control quantity and a duty cycle control quantity of the switch drive signal based on the first compensation control quantity includes: when the first compensation control quantity is greater than an upper limit of the value range of the period of the switch drive signal, converting the first compensation control quantity to a second compensation control quantity, where the second compensation quantity is a control quantity corresponding to the duty cycle of the switch drive signal; and determining the period control quantity and the duty cycle control quantity based on the second compensation quantity.

In the embodiment of the present application, the second compensation control quantity is a control quantity that corresponds to the duty cycle of the switch drive signal and can compensate for the error value. Controlling the switch drive signal based on the duty cycle control quantity may implement the control of a current, especially a large current, of an input terminal.

In some possible embodiments, the determining the period control quantity and the duty cycle control quantity based on the second compensation control quantity includes: when the second compensation control quantity satisfies the value range of the duty cycle of the switch drive signal, determining the duty cycle control quantity to be the second compensation control quantity and the period control quantity to be the upper limit of the value range of the period of the switch drive signal.

In the embodiment of the present application, the duty cycle control quantity is equal to the second compensation control quantity, and the duty cycle control quantity is precisely within a range of the duty cycle control quantity that is required for normal operation of the circuit.

In some possible embodiments, the determining the period control quantity and the duty cycle control quantity based on the second compensation control quantity includes: when the second compensation control quantity is less than the lower limit of the value range of the duty cycle of the switch drive signal, determining the duty cycle control quantity to be the lower limit of the value range of the duty cycle of the switch drive signal and the period control quantity to be the upper limit of the value range of the period of the switch drive signal.

In the embodiment of the present application, the duty cycle control quantity is equal to a lower limit value of the value range of the duty cycle, and the duty cycle control quantity is a minimum duty cycle control quantity required for normal operation of the circuit, such that the circuit operates normally.

In some possible embodiments, the determining the period control quantity and the duty cycle control quantity based on the second compensation control quantity includes: when the second compensation control quantity is greater than the upper limit of the value range of the duty cycle of the switch drive signal, determining the duty cycle control quantity to be the upper limit of the value range of the duty cycle of the switch drive signal and the period control quantity to be the upper limit of the value range of the period of the switch drive signal.

In the embodiment of the present application, the duty cycle control quantity is equal to an upper limit value of the value range of the duty cycle, and the duty cycle control quantity is a maximum duty cycle control quantity required for normal operation of the circuit, such that the circuit operates normally.

A second aspect of the present application provides an apparatus for controlling a reverse current of a phase-shifted full-bridge circuit, including: an obtaining module configured to obtain a sampling value of a reverse input current of the phase-shifted full-bridge circuit and a reference value of the reverse input current; a processing module configured to: determine an error value of the reverse input current based on the sampling value of the current and the reference value of the current; determine a first compensation control quantity of a switch drive signal of the phase-shifted full-bridge circuit based on the error value, where the first compensation control quantity is a control quantity that corresponds to a period or duty cycle of the switch drive signal and can compensate for the error value; and determine a period control quantity and a duty cycle control quantity of the switch drive signal based on the first compensation control quantity, where the period control quantity is within a value range of the period of the switch drive signal, and the duty cycle control quantity is within a value range of the duty cycle of the switch drive signal; and a control module configured to control the switch drive signal based on the period control quantity and the duty cycle control quantity.

In the embodiment of the present application, after the compensation control quantity is determined by the processing module based on the sampling value and the reference value of the reverse input current of the phase-shifted full-bridge circuit that are obtained by the obtaining module, the period control quantity and the duty cycle control quantity that are used to control the switch drive signal are determined by the processing module based on the compensation control quantity. In this way, both the period and the duty cycle of the switch drive signal are adjustable, so that a control range of the input current can be greatly expanded.

In some possible embodiments, the processing module is configured to: when the first compensation control quantity satisfies the value range of the period of the switch drive signal, determine the period control quantity to be the first compensation control quantity and the duty cycle control quantity to be the first predetermined value.

In some possible embodiments, the processing module is configured to: when the first compensation control quantity is less than a lower limit of the value range of the period of the switch drive signal, determine the period control quantity to be the lower limit of the value range of the period of the switch drive signal and the duty cycle control quantity to be the first predetermined value.

In some possible embodiments, the processing module is configured to: when the first compensation control quantity is greater than an upper limit of the value range of the period of the switch drive signal, convert the first compensation control quantity to a second compensation control quantity, where the second compensation quantity is a control quantity corresponding to the duty cycle of the switch drive signal; and determine the period control quantity and the duty cycle control quantity based on the second compensation quantity.

In some possible embodiments, the processing module is configured to: when the second compensation control quantity satisfies the value range of the duty cycle of the switch drive signal, determine the duty cycle control quantity to be the second compensation control quantity and the period control quantity to be the upper limit of the value range of the period of the switch drive signal.

In some possible embodiments, the processing module is configured to: when the second compensation control quantity is less than the lower limit of the value range of the duty cycle of the switch drive signal, determine the duty cycle control quantity to be the lower limit of the value range of the duty cycle of the switch drive signal and the period control quantity to be the upper limit of the value range of the period of the switch drive signal.

In some possible embodiments, the processing module is configured to: when the second compensation control quantity is greater than the upper limit of the value range of the duty cycle of the switch drive signal, determine the duty cycle control quantity to be the upper limit of the value range of the duty cycle of the switch drive signal and the period control quantity to be the upper limit of the value range of the period of the switch drive signal.

A third aspect of the present application provides an apparatus for controlling a reverse current of a phase-shifted full-bridge circuit, including a memory and a processor, where the memory is configured to store instructions, and the processor is configured to read the instructions and perform, based on the instructions, the above method in the first aspect and any of the possible implementations in the first aspect.

A fourth aspect of the present application provides a phase-shifted full-bridge circuit, including the apparatus for controlling a reverse current of a phase-shifted full-bridge circuit in the second or third aspect.

A fifth aspect of the present application provides a readable storage medium configured to store a computer program, where the computer program is used to perform the method in the first aspect and any of the possible implementations in the first aspect.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. Based on the embodiments of the present application, all other embodiments obtained by those of ordinary skill in the art without any creative effort fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that unless otherwise explicitly specified and defined, the terms "mounting", "connecting", "connection", "attaching", and "disposed" should be understood in a broad sense, for example, they may be a fixed connection, a detachable connection, or an integrated connection; may be a direct connection, an indirect connection by means of an intermediate medium, or internal communication between two elements. For those of ordinary skill in the art, the specific meaning of the foregoing term in the present application may be understood according to specific circumstances.

The term "and/or" in the present application is merely a description of the associated relationship of associated objects, representing that three relationships may exist. For example, A and/or B, may be expressed as: the three instances of A alone, A and B simultaneously, and B alone. In addition, the character "/" in the present application generally indicates that the associated objects before and after the character are in a relationship of "or".

In the present application, "a plurality of" means two or more (including two), and similarly, "a plurality of groups" means two or more groups (including two groups), and "a plurality of pieces" means two or more pieces (including two pieces).

In an existing method for controlling a current of a phase-shifted full-bridge circuit, positive control of the magnitude of the current of the circuit is implemented mainly by adjusting a duty cycle of the circuit. When a switching period is a fixed value, if an input current is controlled only by adjusting the duty cycle, wide-range current control cannot be implemented.

In view of this, an embodiment of the present application provides a solution for controlling a reverse current of a phase-shifted full-bridge circuit, which implements wide-range current control based on control of a period control quantity and a duty cycle control quantity of a switch drive signal.

The present application provides an effective method for controlling a reverse current of a phase-shifted full-bridge circuit. This current control method may be applicable to various devices related to charging and discharging of batteries.

Phase-shifted full-bridge refers to a full-bridge topology with soft switching during operation in the positive direction. Zero-voltage soft switching of a primary-side full-bridge switch transistor is implemented by utilizing phase-shifted control and resonant inductance between two bridge arms of a primary-side full bridge.

Reverse current control refers to controlling an input current when the current is input from a secondary-side rectifier bridge.

A period refers to a time interval between two adjacent pulses in a periodically repeated pulse sequence.

A duty cycle refers to a percentage of switch-on duration of a switch in a circuit in the whole operating period of the circuit. A duty cycle is controlled by modulating a pulse width of a voltage signal at a specific frequency on a switch by an electronic control unit, that is, duty cycle control is implemented, to implement precise and continuous control of operating conditions of elements.

A period control quantity is a control quantity for controlling the magnitude of a switching frequency in a circuit.

A duty cycle control quantity is a control quantity for controlling a percentage of switch-on duration of a secondary-side switch in the whole operating period of a circuit.

A switch drive signal is a signal that drives each switch in a phase-shifted full-bridge circuit to be switched on and off. The switch drive signal may be a pulse signal, which is not limited in the embodiment.

A compensation control quantity refers to a value obtained by compensating for an error value of a current by a compensator. The compensator may include a PI controller, a Venable controller, a PR controller, a PID controller, etc., which is not limited in the embodiment of the present application. Since the compensator gradually adjusts its output compensation control quantity according to the principle of closed-loop negative feedback, an input error value becomes increasingly smaller. In this process, the compensation control quantity output by the compensator is in a process of gradual convergence, so as to finally make the input error value approach zero. Due to characteristics of an input current of a DC source on a secondary side of the phase-shifted full-bridge circuit, to make a current error value obtained after adjustment by the compensator return to zero, the compensation control quantity output by the compensator may exceed a value range of a period/duty cycle after final convergence.

In addition, when an input voltage fluctuates or a current reference value changes, the current error value may fluctuate, which causes the compensation control quantity to fluctuate, causing the compensation control quantity to exceed the value range of the period/duty cycle. In this case, if the period control quantity or the duty cycle control quantity is directly used as the compensation control quantity, a failure may occur in the circuit to damage it. Therefore, when the compensation control quantity exceeds the value range of the period/duty cycle of the switch drive signal, the period control quantity is set to an extreme value within a range of the period of the switch drive signal, and the duty cycle control quantity is set to be an extreme value within a range of the duty cycle of the switch drive signal, such that the circuit may be protected for normal operation, and wide-range current control is implemented at the same time.

For ease of description in the following embodiments, a phase-shifted full-bridge circuit according to an embodiment of the present application is used as an example for description.

Figure 1:
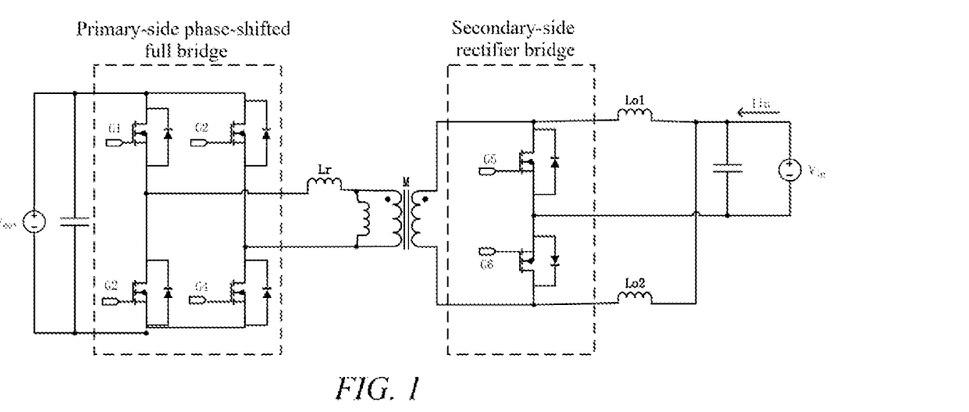
FIG. 1 is a schematic diagram of an application scenario of a method for controlling a reverse current of a phase-shifted full-bridge circuit according to an embodiment of the present application.

FIG. 1 is a schematic diagram of an application scenario of a technical solution according to an embodiment of the present application. As shown in FIG. 1, a phase-shifted full-bridge circuit includes a primary-side full bridge, a resonant inductor Lr, a transformer M, a secondary-side rectifier bridge, and an output inductor Lo. The primary-side full bridge is on the left side of the transformer M, the secondary-side rectifier bridge is on the right side of the transformer M, a primary-side full-bridge circuit may include a plurality of switches G1 to G4, and the secondary-side rectifier bridge may include a plurality of switches G5 and G6. The phase-shifted full-bridge circuit may include at least one output inductor Lo, for example, the two output inductors Lo1, Lo2 included in the structure of the circuit shown in FIG. 1. When a current is input from a DC source Vin on a secondary side, the input current on this side has the following characteristics: When a duty cycle satisfies the input current satisfies:

$$D \leq 1 - \frac{Vin * n}{Vout},$$

the input current satisfies:

$$Iin = \frac{n^2 * Vin * T}{Lr + Lm}.$$

When the duty cycle satisfies $$D \geq 1 - \frac{Vin * n}{Vout},$$

the input current satisfies:

$$Iin = 2*n*\left(\left(D - 1 + \frac{Vin * n}{Vout}\right)*\frac{Vout * T}{Lr} + \frac{n * Vin * T}{2*(Lr + Lm)}\right).$$

Vin denotes a voltage of an input DC source, Vout denotes a voltage of an output DC source, n denotes a ratio of turns on a primary side of the transformer to that on a secondary side of the transformer, Lr denotes a resonant inductor, Lm denotes an excitation inductance obtained through conversion from the transformer to the primary side, D denotes a duty cycle, and T denotes a switching period.

In an implementation, when the duty cycle D is less than a critical duty cycle, the magnitude of an input current may be controlled by adjusting the switching period T. When the duty cycle D is greater than the critical duty cycle, the switching period T may be fixed to a maximum value, and the magnitude of the input current may be controlled by adjusting the duty cycle D, to implement wide-range current control.

Figure 2:
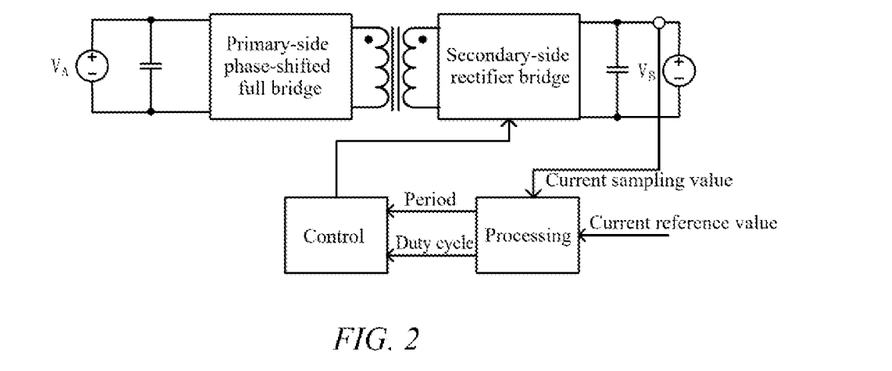
FIG. 2 is an architectural diagram of a method for controlling a reverse current of a phase-shifted full-bridge circuit according to an embodiment of the present application.

FIG. 2 shows an architecture of a method for controlling a reverse current of a phase-shifted full-bridge circuit according to an embodiment of the present application. An input current on a secondary-side rectifier bridge side is collected by a sampling circuit, a current sampling value and a current reference value are processed by a processing module, and then a period control quantity/duty cycle control quantity is output to control a switch drive signal.

Figure 3:
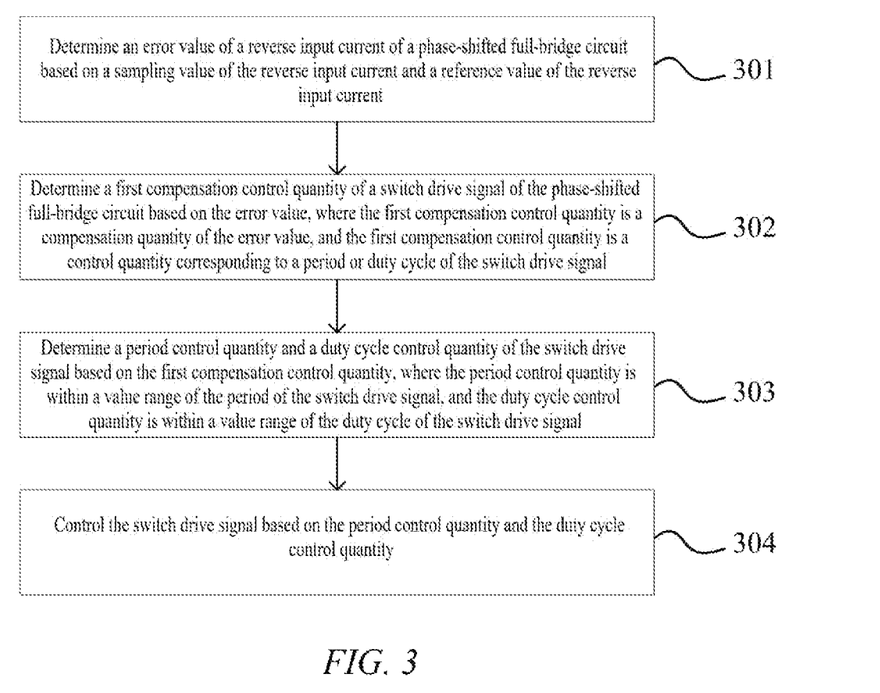
FIG. 3 is a schematic flowchart of a method for controlling a reverse current of a phase-shifted full-bridge circuit according to an embodiment of the present application.

FIG. 3 is a schematic flowchart of a method for controlling a reverse current of a phase-shifted full-bridge circuit according to an embodiment of the present application.

In step 301, an error value of a reverse input current of the phase-shifted full-bridge circuit is determined based on a sampling value of the reverse input current and a reference value of the reverse input current.

The reverse input current is an input current of a DC source on a secondary side.

The sampling value is a sampling value of the current in the phase-shifted full-bridge circuit. For example, as shown in FIG. 2, a sampling circuit may be used to obtain the sampling value.

The reference value is a desired current value in the phase-shifted full-bridge circuit.

The error value refers to an error quantity between the sampling value of the reverse input current in the phase-shifted full-bridge circuit and the reference value of the reverse input current.

In step 302, a first compensation control quantity of a switch drive signal of the phase-shifted full-bridge circuit is determined based on the error value, where the first compensation control quantity is a compensation quantity of the error value, the first compensation control quantity is a control quantity corresponding to a period or duty cycle of the switch drive signal, and the first compensation control quantity is a control quantity that corresponds to the period or duty cycle of the switch drive signal and can compensate for the error value.

For example, the first compensation control quantity may be determined by a compensator. The compensator may include a PI controller, a Venable controller, a PR controller, a PID controller, etc., which is not limited in the embodiment.

In step 303, a period control quantity and a duty cycle control quantity of the switch drive signal are determined based on the first compensation control quantity, where the period control quantity is within a value range of the period of the switch drive signal, and the duty cycle control quantity is within a value range of the duty cycle of the switch drive signal.

The value range of the period is related to specific parameter design of the circuit. The value range of the period may include upper limit and lower limit ranges, a preset range, a modifiable range, etc. of a switching frequency used, which is not limited in the embodiment.

The value range of the duty cycle refers to a range of a percentage of a duration during which a circuit is controlled to be turned on in the whole operating period of the circuit. The value range of the duty cycle may include a preset range, a modifiable range, etc., which is not limited in the embodiment. An upper limit of the value range of the duty cycle may be determined based on a current value required by the circuit, or may be a preset upper limit, or the like, which is not limited in the embodiment. A lower limit of the value range of the duty cycle may be a preset lower limit, a lower limit determined based on a functional relationship, or the like, which is not limited in the embodiment.

In step 304, the switch drive signal is controlled based on the period control quantity and the duty cycle control quantity.

For example, the switch drive signal may be controlled by a PWM controller based on the period control quantity and the duty cycle control quantity.

In the embodiment of the present application, after the compensation control quantity is obtained based on the sampling value and the reference value of the reverse input current of the phase-shifted full-bridge circuit, the period control quantity and the duty cycle control quantity that are used to control the switch drive signal are determined based on the compensation control quantity. In this way, both the period and the duty cycle of the switch drive signal are adjustable, so that a control range of the input current can be greatly expanded.

Figure 4:
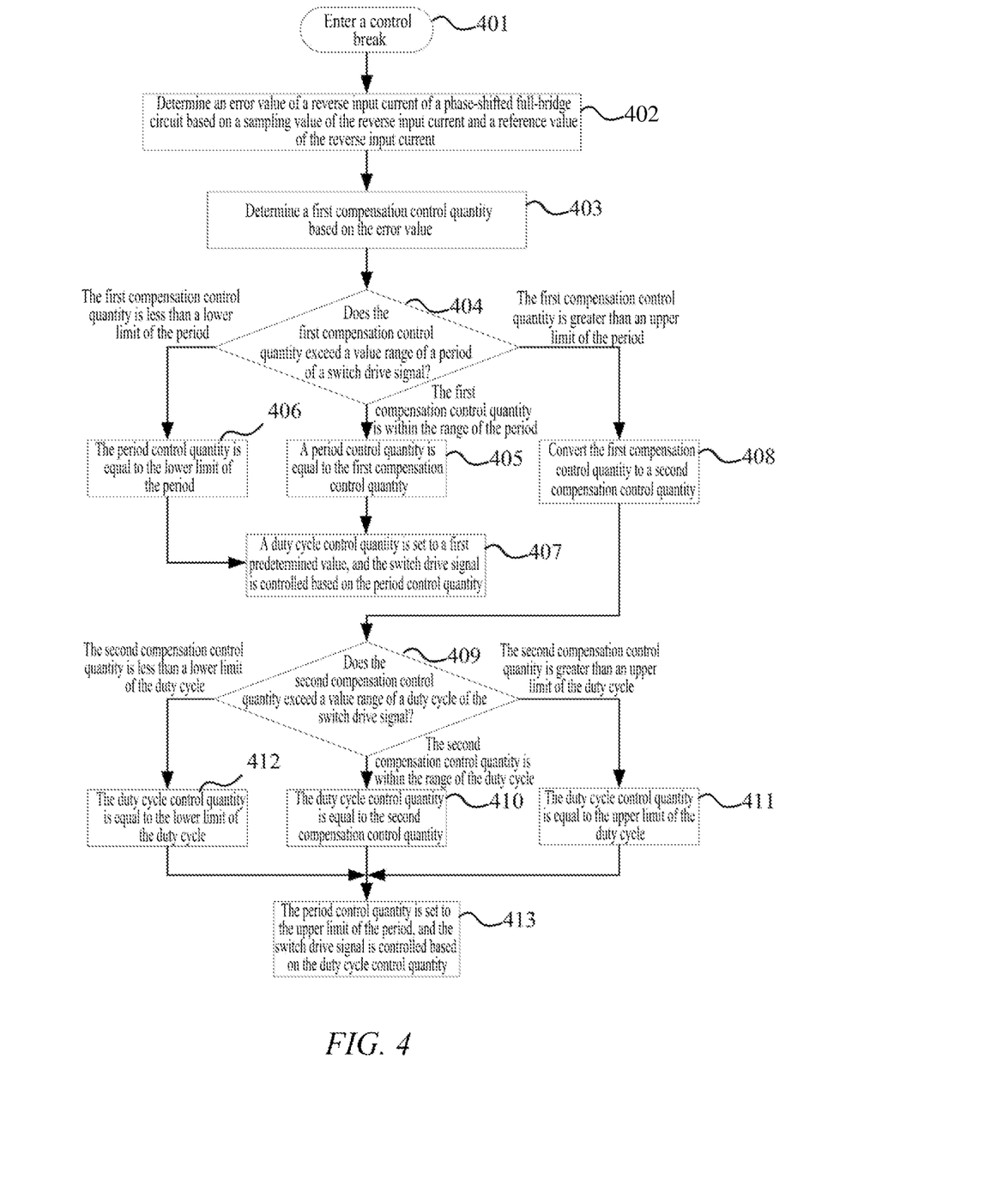
FIG. 4 is a schematic flowchart of a method for controlling a reverse current of a phase-shifted full-bridge circuit according to an embodiment of the present application.

FIG. 4 is a schematic flowchart of a method for controlling a reverse current of a phase-shifted full-bridge circuit according to an embodiment of the present application. For steps in the embodiment that are similar to those in the above embodiment, reference may be made to the above embodiment, and for brevity, details are not described herein again.

In step 401, entering a control break is performed.

The control break means that the system may automatically enter a control break program according to a set time interval or a trigger signal. The current control method in the embodiment of the present application starts to be performed after entering the control break.

In step 402, an error value of a reverse input current of the phase-shifted full-bridge circuit is determined based on a sampling value of the reverse input current and a reference value of the reverse input current.

In step 403, a first compensation control quantity of a switch drive signal of the phase-shifted full-bridge circuit is determined based on the error value.

In some embodiments of the present application, optionally, the first compensation control quantity is, when the duty cycle control quantity is set to a first predetermined value, a control quantity that corresponds to a period of the switch drive signal and can compensate for the error value.

The first compensation control quantity may include a value obtained by compensating for the error value of the current by a compensator, which is not limited in the embodiment. The first predetermined value is a preset value of the duty cycle control quantity within a value range of the duty cycle. The first predetermined value may include an upper limit and a lower limit of the duty cycle, any preset value within the range of the duty cycle, etc., which is not limited in the embodiment. Optionally, in the case of a small current, the first predetermined value may be set to the lower limit of the duty cycle.

In the embodiment of the present application, when the duty cycle control quantity is set to the first predetermined value, the period control quantity and the duty cycle control quantity of the switch drive signal are determined based on the first compensation control quantity, such that in the case of a fixed duty cycle, the period of the switch drive signal is adjusted, to implement control of the small current.

In step 404, whether the first compensation control quantity exceeds a value range of the period of the switch drive signal is determined.

In an embodiment of the present application, optionally, in step 405, when the first compensation control quantity satisfies the value range of the period of the switch drive signal, the period control quantity is determined to be the first compensation control quantity. Then, step 407 is performed, that is, the duty cycle control quantity is set to the first predetermined value, and the switch drive signal is controlled based on the period control quantity.

The first compensation control quantity satisfying the value range of the period of the switch drive signal means that the first compensation control quantity is within a range from an upper limit to a lower limit of the period of the switch drive signal. In other words, the first compensation control quantity is lower than the upper limit of the period and higher than the lower limit of the period.

In the embodiment of the present application, when the first compensation control quantity is within the value range of the period of the switch drive signal, the first compensation control quantity is set to the period control quantity, and the period control quantity is precisely within a range of the period control quantity that is required for normal operation of the circuit.

In an embodiment of the present application, optionally, in step 406, when the first compensation control quantity is less than the lower limit of the value range of the period of the switch drive signal, the period control quantity is determined to be the lower limit of the value range of the period of the switch drive signal. Then, step 407 is performed, that is, the duty cycle control quantity is set to the first predetermined value, and the switch drive signal is controlled based on the period control quantity.

The lower limit of the value range of the period is a minimum value of the value range of the period. It may include an upper limit of a switching frequency of the circuit, a preset lower limit value of the period, etc., which is not limited in the embodiment.

In the embodiment of the present application, when the first compensation control quantity is less than the lower limit of the value range of the period, if the first compensation control quantity is set to the period control quantity, the period control quantity may be less than a minimum period control quantity required for normal operation of the circuit, causing a failure in the circuit. Therefore, when the first compensation control quantity is less than the lower limit of the value range of the period, the period control quantity is equal to a lower limit value of the value range of the period, which may enable the circuit to operate normally.

In an embodiment of the present application, optionally, in step 408, when the first compensation control quantity is greater than the upper limit of the value range of the period of the switch drive signal, the first compensation control quantity is converted to a second compensation control quantity. In this case, the period control quantity and the duty cycle control quantity are further determined based on the second compensation quantity.

The second compensation control quantity is a control quantity that corresponds to the duty cycle of the switch drive signal and can compensate for the error value. The second compensation control quantity may be determined based on the first compensation control quantity, and a determining method may include multiplying the first compensation control quantity by a specific coefficient, etc., which is not limited in the embodiment. The specific coefficient may include a preset coefficient value, a coefficient value determined based on a functional relationship, a coefficient value determined by table look-up, etc., which is not limited in the embodiment.

The upper limit of the value range of the period is a maximum value of the value range of the period. It may include a lower limit value of the switching frequency, a preset upper limit value of the period, etc., which is not limited in the embodiment.

In the embodiment of the present application, the switch drive signal of the circuit may be controlled based on the duty cycle control quantity, and when there is a need to increase a current output by the circuit, the period may be fixed to the upper limit value of the period, and the duty cycle control quantity may be adjusted, so as to control the switch drive signal, which may avoid a switching loss.

In step 409, whether the second compensation control quantity exceeds the value range of the duty cycle of the switch drive signal is determined.

In an embodiment of the present application, optionally, in step 410, when the second compensation control quantity satisfies the value range of the duty cycle of the switch drive signal, the duty cycle control quantity is determined to be the second compensation control quantity. Then, step 413 is performed, that is, the period control quantity is set to the upper limit of the period, and the switch drive signal is controlled based on the duty cycle control quantity.

The second compensation control quantity satisfying the value range of the duty cycle of the switch drive signal means that the second compensation control quantity is within a range from an upper limit to a lower limit of the duty cycle of the switch drive signal. In other words, the second compensator control quantity is lower than the upper limit of the duty cycle and higher than the lower limit of the duty cycle.

In the embodiment of the present application, when the second compensation control quantity is within the value range of the duty cycle of the switch drive signal, if the second compensation control quantity is set to the duty cycle control quantity, the duty cycle control quantity is precisely within a range of the duty cycle control quantity that is required for normal operation of the circuit.

In an embodiment of the present application, optionally, in step 411, when the second compensation control quantity is greater than the upper limit of the value range of the duty cycle of the switch drive signal, the duty cycle control quantity is determined to be the upper limit of the value range of the duty cycle of the switch drive signal. Then, step 413 is performed, that is, the period control quantity is set to the upper limit of the period, and the switch drive signal is controlled based on the duty cycle control quantity.

In the embodiment of the present application, due to characteristics of the compensation control quantity, the following case may occur: the second compensation control quantity is greater than the upper limit of the value range of the duty cycle of the switch drive signal. In this case, if the second compensation control quantity is set to the duty cycle control quantity, a case in which the duty cycle control quantity is greater than a maximum duty cycle control quantity that is required for normal operation of the circuit may occur, causing a failure in the circuit. Therefore, when the second compensation control quantity is greater than the upper limit of the value range of the duty cycle, the duty cycle control quantity is set to an upper limit value of the value range of the duty cycle, which may enable the circuit to operate normally.

In an embodiment of the present application, optionally, in step 412, when the second compensation control quantity is less than the lower limit of the value range of the duty cycle of the switch drive signal, the duty cycle control quantity is determined to be the lower limit of the value range of the duty cycle of the switch drive signal. Then, step 413 is performed, that is, the period control quantity is set to the upper limit of the period, and the switch drive signal is controlled based on the duty cycle control quantity.

The second compensation control quantity being less than the lower limit of the value range of the duty cycle of the switch drive signal means that due to characteristics of the first compensation control quantity, the second compensation control quantity determined based on the first compensation control quantity may exceed the value range of the duty cycle after final convergence. Therefore, the following case may occur: the second compensation control quantity is less than the lower limit of the value range of the duty cycle of the switch drive signal or greater than the upper limit of the value range of the duty cycle of the switch drive signal.

In the embodiment of the present application, due to characteristics of the compensation control quantity, the following case may occur: the second compensation control quantity is less than the lower limit of the value range of the duty cycle of the switch drive signal. When the second compensation control quantity is less than the lower limit of the value range of the duty cycle, if the second compensation control quantity is set to the duty cycle control quantity, a case in which the duty cycle control quantity is less than a minimum duty cycle control quantity that is required for normal operation of the circuit may occur, causing a failure in the circuit. Therefore, when the second compensation control quantity is less than the lower limit of the value range of the duty cycle, the duty cycle control quantity is set to a lower limit value of the value range of the duty cycle, which may enable the circuit to operate normally.

In the above embodiment, the first compensation control quantity is, when the duty cycle control quantity is set to a first predetermined value, a control quantity that corresponds to the period of the switch drive signal and can compensate for the error value. Those skilled in the art can understand that the period and the duty cycle may be exchanged, that is, the first compensation control quantity may alternatively be, when the period control quantity is set to a second predetermined value, a control quantity that corresponds to the duty cycle of the switch drive signal and can compensate for the error value. The period and the duty cycle are exchanged accordingly in subsequent processing, and for brevity, details are not repeated herein.

The method for controlling a reverse current of a phase-shifted full-bridge circuit according to an embodiment of the present application is described above. An apparatus for controlling a reverse current of a phase-shifted full-bridge circuit according to an embodiment of the present application is described below. For the parts not described in detail, reference can be made to the above embodiments.

Figure 5:
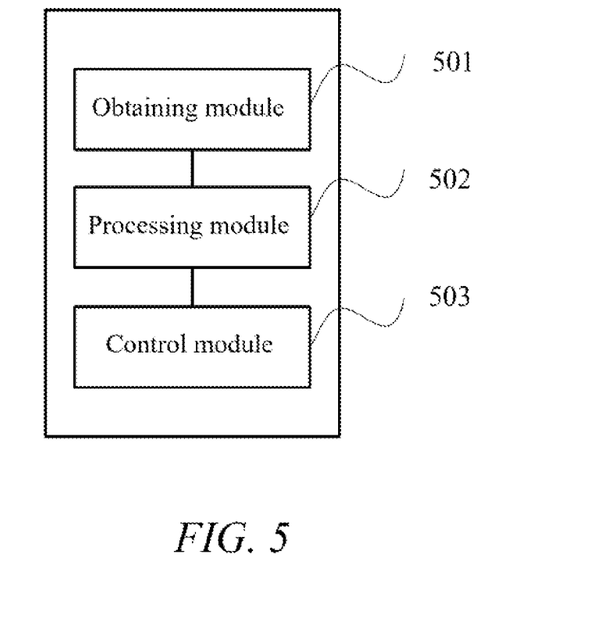
FIG. 5 is a schematic block diagram of an apparatus for controlling a reverse current of a phase-shifted full-bridge circuit according to another embodiment of the present application.

FIG. 5 is a schematic block diagram of an apparatus for controlling a reverse current of a phase-shifted full-bridge circuit according to another embodiment of the present application. In the embodiment of the present application, the apparatus for controlling a reverse current of a phase-shifted full-bridge circuit may include an obtaining module 501, a processing module 502, and a control module 503.

The obtaining module 501 may be configured to obtain a sampling value of a reverse input current of the phase-shifted full-bridge circuit and a reference value of the reverse input current.

The obtaining module 501 may be further configured to obtain the sampling value of the reverse input current, which means that the obtaining module 501 obtains an input current on a secondary-side rectifier bridge side. The obtaining module 501 may be further configured to obtain the sampling value of the reverse input current of the phase-shifted full-bridge circuit, the reference value of the reverse input current, a sampling value of a positive input current, a sampling value and a reference value of a voltage, etc., which is not limited in the embodiment.

The processing module 502 may be configured to: determine an error value of the reverse input current based on the sampling value of the reverse input current and the reference value of the reverse input current; determine a first compensation control quantity of a switch drive signal of the phase-shifted full-bridge circuit based on the error value of the reverse input current; and determine a period control quantity and a duty cycle control quantity of the switch drive signal based on the first compensation control quantity.

The first compensation control quantity is a control quantity of the period or duty cycle of the switch drive signal that can compensate for the error value of the current. For example, the processing module 502 may determine the first compensation control quantity by a compensator. The compensator may include a PI controller, a Venable controller, a PR controller, a PID controller, etc., which is not limited in the embodiment.

The control module 503 may be configured to control the switch drive signal based on the period control quantity and the duty cycle control quantity. For example, the control module 503 may control the switch drive signal via a PWM controller based on the period control quantity and the duty cycle control quantity that are determined by the processing module 502.

In an embodiment of the present application, the processing module 502 may be configured to determine whether the first compensation control quantity exceeds a value range of the period of the switch drive signal.

In an embodiment of the present application, optionally, the processing module 502 may be configured to: when the first compensation control quantity satisfies the value range of the period of the switch drive signal, determine the period control quantity to be the first compensation control quantity, and determine the duty cycle control quantity to be a first predetermined value. The first predetermined value may include an upper limit and a lower limit of the duty cycle, any preset value within the range of the duty cycle, etc., which is not limited in the embodiment. Optionally, in the case of a small current, the first predetermined value may be set to the lower limit of the duty cycle. The control module 503 may be configured to: when the duty cycle control quantity is set to the first predetermined value, control the switch drive signal based on the period control quantity.

In the embodiment of the present application, the processing module 502 sets the first compensation control quantity as the period control quantity when the first compensation control quantity satisfies the value range of the period of the switch drive signal, and therefore the period control quantity is precisely within a range of the period control quantity that is required for normal operation of the circuit.

In an embodiment of the present application, optionally, the processing module 502 may be configured to: when the first compensation control quantity is less than a lower limit of a value range of the period of the switch drive signal, determine the period control quantity to be the lower limit of the value range of the period of the switch drive signal, and determine the duty cycle control quantity to be a first predetermined value. The control module 503 may be configured to: when the duty cycle control quantity is set to the first predetermined value, control the switch drive signal based on the period control quantity.

In the embodiment of the present application, when the first compensation control quantity is less than the lower limit of the value range of the period of the switch drive signal, if the processing module 502 determines the first compensation control quantity as the period control quantity, the period control quantity is lower than a range of the period control quantity that is required for normal operation of the circuit, which may cause a failure in the circuit. Therefore, when the first compensation control quantity is less than the lower limit of the value range of the period of the switch drive signal, the processing module 502 determines that the period control quantity is equal to a lower limit value of the period of the switch drive signal.

In some embodiments of the present application, optionally, the processing module 502 may be configured to: when the first compensation control quantity is greater than an upper limit of the value range of the period of the switch drive signal, convert the first compensation control quantity to a second compensation control quantity. The processing module 502 determines the period control quantity and the duty cycle control quantity based on the second compensation control quantity.

The second compensation control quantity is a control quantity that corresponds to the duty cycle of the switch drive signal and can compensate for the error value. The second compensation control quantity may be determined based on the first compensation control quantity, and a determining method may include multiplying the first compensation control quantity by a specific coefficient, etc., which is not limited in the embodiment. The specific coefficient may include a preset coefficient value, a coefficient value determined based on a functional relationship, a coefficient value determined by table look-up, etc., which is not limited in the embodiment. Optionally, the second compensation control quantity may further include a compensation control quantity obtained by compensating for the error value of the current by the compensator.

In the embodiment of the present application, the switch drive signal of the circuit may be controlled based on the duty cycle control quantity, and when there is a need to increase a current output by the circuit, the period may be fixed to an upper limit value of the period, and the duty cycle control quantity may be adjusted, so as to control the switch drive signal, which may avoid a switching loss.

In an embodiment of the present application, the processing module 502 may be configured to determine whether the second compensation control quantity exceeds the value range of the duty cycle of the switch drive signal.

In an embodiment of the present application, optionally, the processing module 502 may be configured to: when the second compensation control quantity satisfies the value range of the duty cycle of the switch drive signal, determine the duty cycle control quantity to be the second compensation control quantity, and determine the period control quantity to be the upper limit of the value range of the period of the switch drive signal. The control module 503 may be configured to: when the period control quantity is the upper limit of the value range of the period of the switch drive signal, control the switch drive signal based on the duty cycle control quantity.

In the embodiment of the present application, the processing module 502 determines, when the second compensation control quantity satisfies the value range of the duty cycle of the switch drive signal, that the duty cycle control quantity is equal to the second compensation control quantity. When the second compensation control quantity is within the value range of the duty cycle of the switch drive signal, the second compensation control quantity is set to the duty cycle control quantity, and the duty cycle control quantity is precisely within a range of the duty cycle control quantity that is required for normal operation of the circuit.

In an embodiment of the present application, optionally, the processing module 502 may be configured to: when the second compensation control quantity is less than the lower limit of the value range of the duty cycle of the switch drive signal, determine the duty cycle control quantity to be the lower limit of the value range of the duty cycle of the switch drive signal, and determine the period control quantity to be the upper limit of the value range of the period of the switch drive signal. The control module 503 may be configured to: when the period control quantity is the upper limit of the value range of the period of the switch drive signal, control the switch drive signal based on the duty cycle control quantity.

In the embodiment of the present application, the processing module 502 determines, when the second compensation control quantity is less than the lower limit of the value range of the duty cycle of the switch drive signal, that the duty cycle control quantity is equal to the lower limit of the value range of the duty cycle. Due to characteristics of the compensation control quantity, the following case may occur: the second compensation control quantity determined by the processing module 502 is less than the lower limit of the value range of the duty cycle of the switch drive signal. When the second compensation control quantity is less than the lower limit of the value range of the duty cycle, if the second compensation control quantity is set to the duty cycle control quantity, a case in which the duty cycle control quantity is less than a minimum duty cycle control quantity that is required for normal operation of the circuit may occur, causing a failure in the circuit. Therefore, when the second compensation control quantity is less than the lower limit of the value range of the duty cycle, the duty cycle control quantity is set to a lower limit value of the value range of the duty cycle.

In an embodiment of the present application, optionally, the processing module 502 may be configured to: when the second compensation control quantity is greater than the upper limit of the value range of the duty cycle of the switch drive signal, determine the duty cycle control quantity to be the upper limit of the value range of the duty cycle of the switch drive signal and the period control quantity to be the upper limit of the value range of the period of the switch drive signal. The control module 503 may be configured to: when the period control quantity is the upper limit of the value range of the period of the switch drive signal, control the switch drive signal based on the duty cycle control quantity.

In the embodiment of the present application, the processing module 502 determines, when the second compensation control quantity is greater than the upper limit of the value range of the duty cycle of the switch drive signal, that the duty cycle control quantity is equal to the upper limit of the value range of the duty cycle. Due to characteristics of the compensation control quantity, the following case may occur: the second compensation control quantity is greater than the upper limit of the value range of the duty cycle of the switch drive signal. In this case, if the second compensation control quantity is set to the duty cycle control quantity, a case in which the duty cycle control quantity is greater than a maximum duty cycle control quantity that is required for normal operation of the circuit may occur, causing a failure in the circuit. Therefore, when the second compensation control quantity is greater than the upper limit of the value range of the duty cycle, the duty cycle control quantity is set to an upper limit value of the value range of the duty cycle.

An embodiment of the present application further provides another apparatus for controlling a reverse current of a phase-shifted full-bridge circuit. The apparatus includes a memory and a processor, where the memory is configured to store instructions, and the processor is configured to read the instructions and execute the methods of the above embodiments of the present application based on the instructions.

An embodiment of the present application further provides a readable storage medium configured to store a computer program, where the computer program is used to execute the methods of the above embodiments of the present application.

An embodiment of the present application further provides a phase-shifted full-bridge circuit, including the apparatus for controlling a reverse current of a phase-shifted full-bridge circuit according to the above embodiment of the present application.

In the embodiment of the present application, wide-range current control is implemented by adjusting the switching period and the duty cycle of the circuit, which may meet charging and discharging requirements of batteries in various scenarios.

While the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A method for controlling a reverse current of a phase-shifted full-bridge circuit, comprising:
   determining an error value of a reverse input current of the phase-shifted full-bridge circuit based on a sampling value of the reverse input current and a reference value of the reverse input current;
   determining a compensation control quantity of a switch drive signal of the phase-shifted full-bridge circuit based on the error value, wherein the compensation control quantity is a compensation quantity of the error value and corresponds to a period or a duty cycle of the switch drive signal;

determining a period control quantity and a duty cycle control quantity of the switch drive signal based on the compensation control quantity, wherein the period control quantity is within a value range of the period of the switch drive signal, and the duty cycle control quantity is within a value range of the duty cycle of the switch drive signal; and controlling the switch drive signal based on the period control quantity and the duty cycle control quantity.

2. The method according to claim 1, wherein determining the period control quantity and the duty cycle control quantity of the switch drive signal based on the compensation control quantity comprises:

in response to the compensation control quantity satisfying the value range of the period of the switch drive signal, determining the period control quantity to be the compensation control quantity and the duty cycle control quantity to be a predetermined value.

3. The method according to claim 1, wherein determining the period control quantity and the duty cycle control quantity of the switch drive signal based on the compensation control quantity comprises:

in response to the compensation control quantity being less than a lower limit of the value range of the period of the switch drive signal, determining the period control quantity to be the lower limit of the value range of the period of the switch drive signal and the duty cycle control quantity to be a predetermined value.

4. The method according to claim 1, wherein:
the compensation control quantity is a first compensation control quantity; and
determining the period control quantity and the duty cycle control quantity of the switch drive signal based on the first compensation control quantity comprises:
in response to the first compensation control quantity being greater than an upper limit of the value range of the period of the switch drive signal, converting the first compensation control quantity to a second compensation control quantity, wherein the second compensation control quantity corresponds to the duty cycle of the switch drive signal; and
determining the period control quantity and the duty cycle control quantity based on the second compensation control quantity.

5. The method according to claim 4, wherein determining the period control quantity and the duty cycle control quantity based on the second compensation control quantity comprises:

in response to the second compensation control quantity satisfying the value range of the duty cycle of the switch drive signal, determining the duty cycle control quantity to be the second compensation control quantity and the period control quantity to be the upper limit of the value range of the period of the switch drive signal.

6. The method according to claim 4, wherein determining the period control quantity and the duty cycle control quantity based on the second compensation control quantity comprises:

in response to the second compensation control quantity being less than a lower limit of the value range of the duty cycle of the switch drive signal, determining the duty cycle control quantity to be the lower limit of the value range of the duty cycle of the switch drive signal and the period control quantity to be the upper limit of the value range of the period of the switch drive signal.

7. The method according to claim 4, wherein determining the period control quantity and the duty cycle control quantity based on the second compensation control quantity comprises:

in response to the second compensation control quantity is greater than an upper limit of the value range of the duty cycle of the switch drive signal, determining the duty cycle control quantity to be the upper limit of the value range of the duty cycle of the switch drive signal and the period control quantity to be the upper limit of the value range of the period of the switch drive signal.

8. An apparatus for controlling a reverse current of a phase-shifted full-bridge circuit, comprising:
an obtaining module configured to obtain a sampling value of a reverse input current of the phase-shifted full-bridge circuit and a reference value of the reverse input current;
a processing module configured to:
determine an error value of the reverse input current based on the sampling value of the current and the reference value of the current;
determine a compensation control quantity of a switch drive signal of the phase-shifted full-bridge circuit based on the error value, wherein the compensation control quantity is a compensation quantity of the error value and corresponds to a period or a duty cycle of the switch drive signal; and
determine a period control quantity and a duty cycle control quantity of the switch drive signal based on the compensation control quantity, wherein the period control quantity is within a value range of the period of the switch drive signal, and the duty cycle control quantity is within a value range of the duty cycle of the switch drive signal; and
a control module configured to control the switch drive signal based on the period control quantity and the duty cycle control quantity.

9. The apparatus according to claim 8, wherein the processing module is further configured to: in response to the compensation control quantity satisfying the value range of the period of the switch drive signal, determine the period control quantity to be the compensation control quantity and the duty cycle control quantity to be a predetermined value.

10. The apparatus according to claim 8, wherein the processing module is further configured to: in response to the compensation control quantity being less than a lower limit of the value range of the period of the switch drive signal, determine the period control quantity to be the lower limit of the value range of the period of the switch drive signal and the duty cycle control quantity to be a predetermined value.

11. The apparatus according to claim 8, wherein:
the compensation control quantity is a first compensation control quantity; and the processing module is further configured to:
in response to the first compensation control quantity being greater than an upper limit of the value range of the period of the switch drive signal, convert the first compensation control quantity to a second compensation control quantity, wherein the second compensation control quantity corresponds to the duty cycle of the switch drive signal; and determine the period control quantity and the duty cycle control quantity based on the second compensation control quantity.

12. The apparatus according to claim 11, wherein the processing module is further configured to: in response to the second compensation control quantity satisfying the value range of the duty cycle of the switch drive signal, determine the duty cycle control quantity to be the second compensation control quantity and the period control quantity to be the upper limit of the value range of the period of the switch drive signal.

13. The apparatus according to claim 11, wherein the processing module is further configured to: in response to the second compensation control quantity being less than a lower limit of the value range of the duty cycle of the switch drive signal, determine the duty cycle control quantity to be the lower limit of the value range of the duty cycle of the switch drive signal and the period control quantity to be the upper limit of the value range of the period of the switch drive signal.

14. The apparatus according to claim 11, wherein the processing module is further configured to: in response to the second compensation control quantity being greater than an upper limit of the value range of the duty cycle of the switch drive signal, determine the duty cycle control quantity to be the upper limit of the value range of the duty cycle of the switch drive signal and the period control quantity to be the upper limit of the value range of the period of the switch drive signal.

15. A phase-shifted full-bridge circuit, comprising:
an apparatus for controlling a reverse current, the apparatus comprising:
  an obtaining module configured to obtain a sampling value of a reverse input current of the phase-shifted full-bridge circuit and a reference value of the reverse input current;
  a processing module configured to:
    determine an error value of the reverse input current based on the sampling value of the current and the reference value of the current;
    determine a compensation control quantity of a switch drive signal of the phase-shifted full-bridge circuit based on the error value, wherein the compensation control quantity is a compensation quantity of the error value and corresponds to a period or a duty cycle of the switch drive signal; and
    determine a period control quantity and a duty cycle control quantity of the switch drive signal based on the compensation control quantity, wherein the period control quantity is within a value range of the period of the switch drive signal, and the duty cycle control quantity is within a value range of the duty cycle of the switch drive signal; and
  a control module configured to control the switch drive signal based on the period control quantity and the duty cycle control quantity.

* * * * *